June 28, 1955 S. C. LEHMAN 2,711,630
ROCKETS
Filed Dec. 28, 1951 2 Sheets-Sheet 1
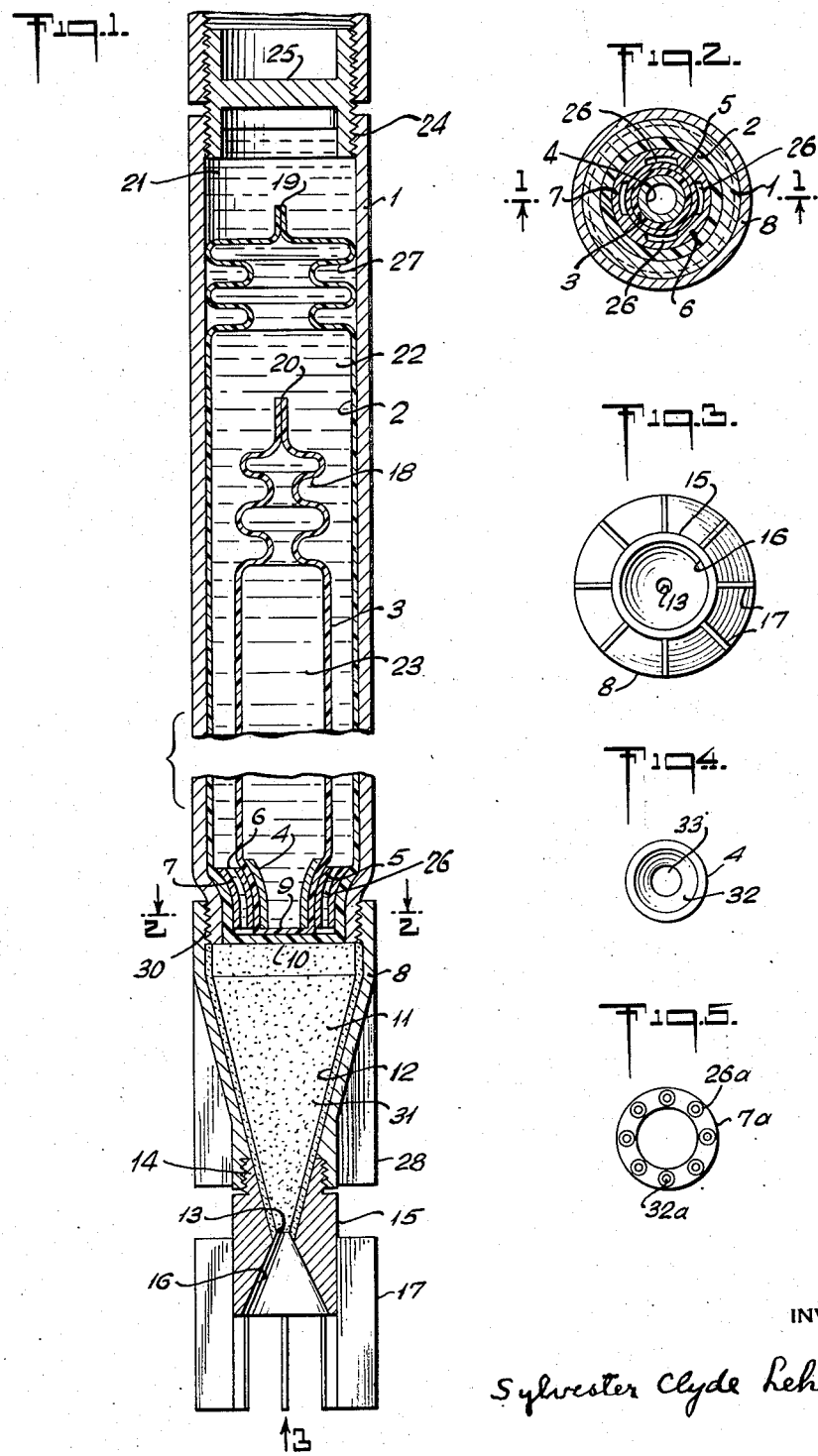
INVENTOR
Sylvester Clyde Lehman June 28, 1955　　　　　S. C. LEHMAN　　　　　2,711,630
ROCKETS
Filed Dec. 28, 1951　　　　　　　　　　　　　2 Sheets-Sheet 2
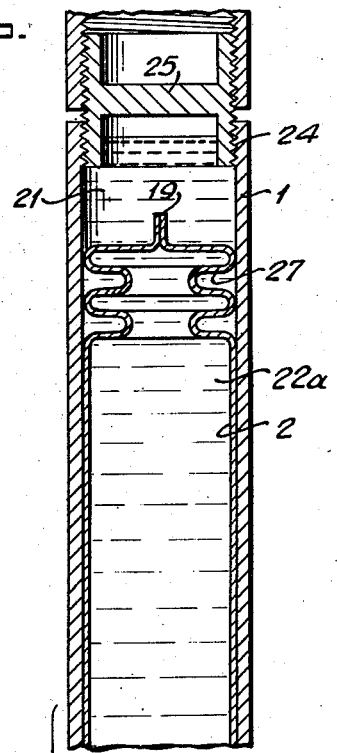
Fig.6.
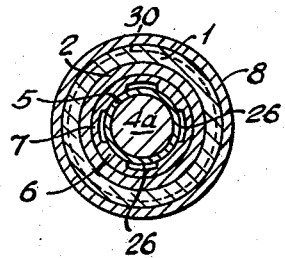
Fig.7.
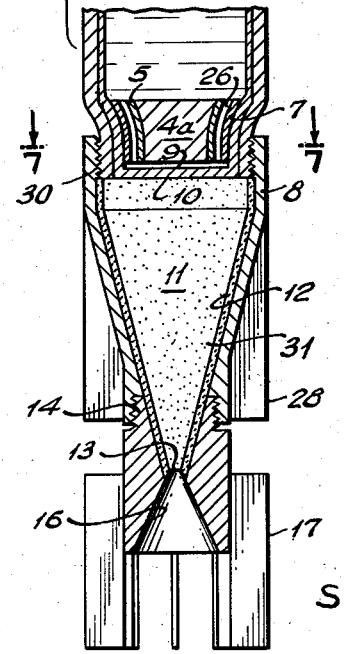
INVENTOR
Sylvester Clyde Lehman United States Patent Office 2,711,630
Patented June 28, 1955

2,711,630

ROCKETS

Sylvester Clyde Lehman, New York, N. Y.

Application December 28, 1951, Serial No. 263,833

10 Claims. (Cl. 60—35.6)

This invention relates to rockets and more particularly to rockets which are adaptable for service at any altitude when adapted for use in weapons of warfare. Most military rockets have heretofore been driven by solid propellants, but the best powder rockets devised so far give a very low thrust ratio per pound of powder consumed, besides having the disadvantage of being uncontrollable while burning, thereby generating irregular pressures, and as a result, providing erratic ballistics. An additional disadvantage in rockets propelled by solid propellants is that solid propellants must be burned within the fuel storage compartment of the rocket, thereby necessitating a large combustion zone and that this combustion storage compartment be provided with heavier walls throughout than would be the case if the storage compartment could be designed for fuel storage use only—as is the case in rockets driven by liquid propellants, where the propellant is burned in a separate, small, combustion chamber. This is due to the fact that combustion chamber materials which are employed in constructing powder rockets, lose their strength to a high degree, if not completely, at high combustion temperatures, thereby requiring a heavier storage-compartment structure, with the resulting provision of a heavier, overall rocket structure than where the propellant is burned in a separate, small combustion compartment.

Higher propulsive efficiencies, besides lower-weight, storage-compartment structures, can be obtained in rockets driven by liquid propellants instead of solid propellants, but such devices have heretofore required complicated starting and operating devices, the propellant materials being started and fed through an intricate valvular induction system, with attendant difficulties of maintaining a correct rate of fuel flow, whereby the dimensions, weight and complexity of the power unit, including the number of controlling manipulations involved, became too great to insure general utility of such devices for small rocket-weapons of warfare.

Fuel pressure systems have been proposed where undesirable mechanical devices such as pumps are omitted for supplying the necessary fuel under suitable pressure, but all of these systems have heretofore required bulky, highly-manipulative, valvular means for starting and regulating the fuel supply.

It is well known that the force of impact in a weapon goes up with the square of the velocity just before impact. High velocity in a rocket weapon is therefor extremely advantageous in anti-tank defense or other forms of demolition warfare. High velocity may be attained as a result of propulsive efficiency—utilizing a given weight of propellant in a rocket to obtain the greatest possible velocity over a given course or range. But, high propulsive efficiency in a rocket has heretofore been obtained at a cost of simplicity in rocket design, which is particularly undesirable when applied to small, economical rockets such as is desired for weapons of warfare.

It is therefor an object of the invention to provide an improved, compact, simplified, economical rocket, whereby high propulsive efficiencies may be obtained by utilizing liquid fuels and where a minimum of manipulative effort, less than that used heretofore for liquid fuel operation, is employed.

It is another object of the invention to provide an improved, compact, liquid-fueled rocket of simplified, economical design, wherein both the flow and combustion of the fuel is automatically started and fed into a small combustion zone upon igniting a small quantity of solid propellant used for launching the rocket.

It is another object of the invention to provide an improved rocket, wherein combustion of a small quantity of solid propellant initially used in charging or filling the combustion chamber, functions also as an automatic means to start the flow of liquid fuel including, in certain cases, where the liquid fuel possesses a high ignition point, means to insure self-ignition of the fuel.

Another object of the invention is to provide in a rocket having the above-named characteristics, easily-manufactured plastic containers which are adaptable for holding highly corrosive liquid-propellant components under all climatic conditions.

Another object of the invention is to provide in a rocket having the above named characteristics, means for insuring chemical stability of highly corrosive fluids, as a safeguard against explosion or deterioration during storage and handling of the rocket.

Other objects and advantages of the invention will be apparent as the following description proceeds, including the accompanying drawing, in which Fig. 1 is a cross sectional view of one embodiment of the invention with the central injector removed for convenience in illustration and is a section taken on line 1—1 of Fig. 2;

Fig. 2 is a section taken on line 2—2 of Fig. 1;

Fig. 3 is a rear or bottom end view of the rocket;

Fig. 4 is an end view of the central spray injector located in the innermost container ring support;

Fig. 5 is a modification showing one of the ring supports provided with several injectors;

Fig. 6 is a cross sectional view of another embodiment of the invention; and

Fig. 7 is a cross sectional view of Fig. 6 taken along the line 7—7 thereof.

In describing the invention, reference is made to a simple form applicable to small weapons of warfare, but it is to be understood that the drawing is merely illustrative and that the same may be applied to various forms of carriers, including bombs, torpedoes, artillery, self-operating weapons and guided missiles.

The rocket shown in the drawings comprises an elongated body having a pressure casing 1, say of metal having a high tensile strength, adapted to withstand high pressures, and secured at its forward end by an hermetical seal to a weapon of warfare by threaded engagement 24 with a capped portion of the weapon thereof. The rear end of the casing 1 is contracted and adapted to be secured to the pressure casing 8 by threaded engagement indicated at 30 providing an hermetical seal. The casing 8 is preferably composed of metal having a high tensile strength, whereby to withstand high pressures. The casing 8 is progressively contracted upon its inner circumference, the smallest internal diameter being at the most rear end of the casing. The casing 8 is progressively contracted upon its outer circumference for a distance and provided with a portion at its rear end in which is a recess and a plug 15 secured thereto by threaded engagement indicated at 14. Preferably this plug should be made of heat-resistant material, one, for example, being molybdenum steel.

The plug 15 has a hollow portion, its forward end having the same internal diameter as the internal rear end of the casing 8, at which point the plug 15 and the casing 8 are joined together. The internal diameter of the plug 15 progressively contracts until it reaches about midway between its forward and rear ends, where the smallest diameter of the plug 15 is formed and then progressively expands as it recedes rearwardly to form the nozzle 16 of the rocket motor. The unthreaded portion of the inner walls of the casing 8 and the adjoining portion of the plug 15, from the smallest diameter in the plug toward the largest diameter in the forward end of the casing 8 are both lined with a refractory material 12. The interior hollow portion of the refractory material 12 forms a combustion chamber 31 of the rocket motor, the smallest diameter thereof forming a throat 13 at the rear end of the combustion chamber. Various substances may be used as the refractory material, one, for example, being magnesia. The combustion chamber 31 is charged, preferably practically filled, with a solid propellant 11, one, for example, being a mixture of about 75 parts by weight of potassium perchlorate and about 25 parts by weight of asphalt. One propellant of this type which is found satisfactory is described in U. S. Patent No. 2,479,470. The solid propellant 11 during burning thereof co-acts with the rear walls of the liquid propellant containers, which are charged or filled under pressure, whereby the rear walls 9 and 10 of the liquid containers become destroyed by the intense heat of the solid-propellant portion lying adjacent wall 10. Upon thermal destruction of the walls 9 and 10 the liquid propellant held in containers 3 and 2, respectively, is free to flow into the combustion chamber 31. Thus the walls 9 and 10 function as diaphragms in an outlet to normally close the same, these walls being supported against rupture by the liquid propellant under pressure by being rigidly supported against the solid propellant 11.

The solid propellant 11 thus functions in a five-fold capacity as follows:

(1) a solid propellant for launching the rocket;

(2) an automatically thermally operated valve-opening means to start the flow of the liquid propellant;

(3) an automatic ignition device to insure positive ignition of the liquid propellant;

(4) an oxygen storage supply to generate copious quantities of oxygen, especially needed should the fuel flow of the liquid propellant start somewhat before the flow of oxidant; where fuels having a very high ignition point are used, oxidant powders may be incorporated with the solid propellant, wherein the potassium perchlorate acts as the oxidant. Preferably such oxidant additions should be incorporated only in the forward portion of the solid propellant 11 in a strata adjoining wall 10. Various ignition or oxidant powders may be used in a proportion so as to produce the desired temperature of the combustion chamber gases; one may be cited, for example, barium peroxide, and (5) an internal support for normally preventing rupture of the valve diaphragms or container portions 9 and 10. Undesired leakage of highly corrosive liquid propellant components is thus positively prevented during storage or transportation of the rocket.

The rocket is illustrated in the drawings and herein described as having a bipropellant for the liquid propellant components, wherein the fuel 22 is held in the outer container 2 and the oxidant 23 is held in the inner container 3 but it is to be understood that instead the fuel and oxidant may vice versa be held in containers 3 and 2, respectively.

The container 2 is provided with a contracted portion at its rear end to fit the interior of the contracted portion of the casing 1 the container 2 having a bottom or rear extension 10. According to the invention, the container 2 is preferably made of non-combustible, flexible, chemically resistant, plastic material, weakenable by heat, which can be easily and economically manufactured to provide a collapsible "bladder" for holding the fuel. Container 3 must have similar properties but, since most oxidants are highly corrosive, must be extremely chemically resistant.

Polytetrafluoroethylene, hereafter called "Teflon," has been found satisfactory as a collapsible material for the containers or "bladders" 2 and 3. Teflon can be boiled in aqua regia, hydrofluoric acid, sulphuric acid, or nitric acid without change in weight or properties. When filled with calcium fluoride it withstands attack of all fluorine compounds and has been used for limited service with fluorine at temperatures as high as 150 degrees C. Teflon is incombustible and thus will not support combustion in a container even though a sedgment has been burned or inflamed. At temperatures about 750 degrees F. Teflon decomposes into a gaseous monomer so as to disallow any of the material to clog up the throat 13 of the combustion chamber, which otherwise might cause a critical combustion-chamber pressure. Thus no material can be released after rupture of the ends to clog up the throat 13 during burning of the liquid propellant. Teflon can be obtained in thicknesses as low as one-fourth of a mil.

Pressure for the fuel and oxidant components 22 and 23, respectively, is supplied by a pressure-generating fluid 21 such as, for example, nitrous oxide, filling the space between the forward portion of the container 2 and the sealed capped portion extending rearwardly from the body portion 25. Nitrous oxide is adaptable for most climatic conditions since it has a fairly high critical temperature of 96.5 degrees F. at 1050 pounds per square inch absolute. For hot climates, propane, having a critical temperature of 207 degrees F. at 42 atmospheres pressure or Freon 22, having a critical temperature of 205 degrees F. at 716 pounds per square inch absolute, may be used instead of nitrous oxide. Where nitrous oxide is used, the same must be in anhydrous form to prevent corrosion of the metal casing 1 and the body portion 25.

The collapsible container 2 is supported in a fixed position by frictional engagement between the interior surface of casing 1 and the exterior surface of ring support 7. Collapsible container 3 is supported in a fixed position by frictional engagement between the interior surface of ring support 5 and the exterior surface of ring support 4. Secured to the interior wall of ring support 4 is injector 32 supported by any suitable means, not shown in the drawings and having a discharge opening 33. Preferably the rear surface of the injector 32 should adjoin the forward surface of the plastic wall 9. As indicated in the drawings the ring supports 4, 5 and 7, including extensions 6 and the contracted rear end of casing 1 are similarly tapered with the smallest diameter being at the rear ends. The outside and inside diameters of ring supports 5 and 7 including extensions 6 and the outer diameter of ring support 4 are designed to telescope as sliding tapered tubes, together with the collapsible container walls 2 and 3 located as indicated therebetween, so as to provide a tight fit throughout and form an integral support for the containers 2 and 3 against the pressure of the fuel 22 and the combusting agent 23, respectively. The forward portions of the containers 2 and 3 are designed in length, before filling, so as to facilitate charging with liquid, closing and sealing so extended, say under heat and pressure, with the container ends extending outside of the casing 1, and the sealed ends 19 and 20 finally compacted within the casing 1 as indicated. Prior to sealing of the ends 19 and 20, the unfilled portions of the container walls are collapsed to remove all excess air and upon sealing, the collapsed portions finally compacted within the casing 1 to provide the compacted folds 27 and 18. The orifices 26 are formed by the extensions 6, these extensions being formed integrally with the ring support 7. Extending from the throat 13 in the plug 15 is an exhaust nozzle 16 which as its hollow portion recedes toward the rear progressively flares to a larger diameter at the exhaust opening. In some cases, it may be desired to provide a somewhat long combustion chamber, the fluid bipropellant compartment being relatively short to provide only a short propelling burst at supersonic speed at the end of the flight trajectory. In this case, vanes 17 are preferably omitted, but otherwise added. Vanes 17 and 28 are fixed to casing 8 and plug 15 as indicated.

In the modified embodiment of the invention shown in Figs. 6 and 7 a monopropellant liquid 22A is employed, as for example, mononitromethane alone or in combination with tetranitromethane. Satisfactory mixtures of the latter type have been described in U. S. Patent No. 2,542,193. The container 3 and its internal ring support 4 as shown in Fig. 1 are omitted and the central orifice is entirely closed by means of a suitable friction plug 4A. Since the other features of this embodiment of the invention are identical to those shown in Fig. 1 like numbers have been used to denote like elements of each figure and the description of those elements in Fig. 1 apply equally to these figures.

In a device similar to the one shown in the drawings, the fuel 22 may be mixed to a high degree with an oxidant, whereby the ratio of fuel to oxidant may approach that almost equivalent to stoichiometric proportions, yet wherein this ratio is maintained sufficiently above or below stoichiometric proportions whereby to provide a fuel-oxidant mixture 22 that will remain relatively insensitive to detonation. For example, benzene, when mixed with 65 percent to 80 percent by volume, preferably about 72 percent, of nitrogen tetroxide, will remain very sensitive to detonation. Above or below this range, say 10 percent to 60 percent or 90 to nearly 100 percent nitrogen tetroxide, when mixed with benzene, will provide a fuel-oxidant mixture which will remain relatively insensitive to detonation. Thus it is possible to provide a safe fuel mixture which contains a large proportion of oxidant during storage of the rocket and then, during flight of the rocket, complete the mixing process in the combustion chamber by adjusting the fuel to oxidant ratio so as to provide an easily-mixed, highly combustible mixture of stoichiometric proportions. In this manner, the rate of combustion can be readily increased to a high degree after providing a fuel to oxidant ratio closely approaching the critical proportions of sensitivity, since only a small proportion of oxidant is then required to complete the mixture providing stoichiometric proportions—the major part of the mixing process has been efficiently carried out prior to injection of the fuel into the combustion chamber. However, the use of benzene-nitrogen tetroxide mixtures are herein cited only as an example for purposes of illustration and the method of carrying out most of the fuel-oxidant mixing process prior to injection of the fuel in the chamber can be applied to various other liquid bipropellants. For example, mixtures of tetranitromethane (oxidant) with such fuels as mononitroxylene, mononitromethane or tetraethyl lead may be advantageously used.

In an alternate device shown in Fig. 5, a ring support 7a is shown to replace the combination of ring support 7 and its extensions 6 as is indicated in Figs. 1 and 2. The ring support 7a is provided with a numerous number of orifices 26a, each of which is provided with an injector 32a. This type of means will provide a uniform, sprayed mixture in the combustion chamber 31.

*Container assembling*

The container walls 2 and 3 over the portions having the largest diameter in each tubular wall may be easily manufactured under plastic molding processes, each portion being formed of flat Teflon tape, with a seam extending lengthwise of the container. The rear cup-shaped portions may be formed as a plastic and then joined to the tubular portions by sealing under heat and pressure. Upon supporting both containers in casing 1 as indicated in Fig. 1 the same may be filled. In the first filling step, container 3 with its open end fully extended while drawn over a filling spout and supported thereto, may be charged with a predetermined supply of fluid, the air withdrawn from the container to collapse the same while still supported over the filling spout, the upper end sealed in this same position by heat and pressure, and the collapsed, sealed end removed from the filling spout. In the second filling step, container 2 may be similarly charged and assembled. Finally, containers 2 and 3 so assembled may be compacted within casing 1 as indicated in Fig. 1. To maintain the portion of the containers dry over the internal area to be later sealed by heat and pressure plastic sealing, any liquid having a low boiling point which might collect upon the container walls may be vaporized under a suitable heat and pressure. Teflon may be subjected to 550 degrees F. for most liquids in contact therewith without serious alteration, at least for short periods. For liquids unsuitable for vaporization, the container may be sealed by some form of metal clamp.

*Operation*

The rocket may be placed in a suitable launching apparatus, stationary or moving, with a conventional fuse inserted in the exhaust nozzle, and the rocket thus launched upon ignition of the solid propellant 11, as a result of the jet propulsion created by the combustion products exhausted from the nozzle. In certain cases, where the rocket is launched as a detachably mounted device in the head of a moving carrier, say a guided rocket, an explosive may be used for the solid propellant 11 to provide launching instantaneously at the highest possible velocity. Upon burning the final portion of the solid propellant 11, the rear ends of the containers as indicated at 10 and 9, will become weakened by the heat generated within the combustion chamber 31, this action being facilitated by lack of support by the solid propellant 11 upon burning away thereof. Upon weakening of the rear ends 10 and 9 and under pressure of the liquid fuel 22 and the combusting fluid 23, respectively, the rear ends 10 and 9 will become ruptured and thermoautomatically destroyed by the heated gaseous products of combustion generated by the solid propellant 11. Upon bursting of the rear ends 10 and 9, the fuel 22 and the combusting agent 23, both being fluids, will be caused to flow into the combustion chamber 31 through the ruptured portions, the heated gases igniting the fluid mixture of fuel 22 and combusting agent 23, and thereby causing the combustion process to continue until the supply of bipropellant has been exhausted. To provide a uniform mixture, the fuel 22 and the combusting agent 23 are advantageously mixed in the combustion chamber 31 upon injection through injectors 32a and 32, respectively. Pressure for the fluids 22 and 23 is maintained by subjecting their collapsible "bladders" to the vaporizing action of the pressure-generating fluid 21. This pressure of the fluid 21 is necessarily maintained above that of the combustion chamber 31 to insure flow of the fuel 22 and the combusting agent 23 during movement of the rocket, even at supersonic velocities, regardless of its direction or abrupt change in direction—up or down, right or left—or any speed or position traveled by the rocket.

Various types of bipropellants may be used to propel the rocket. For example, aniline may be used for the fuel 22 and red fuming nitric acid as the oxidant or combusting agent 23. However, this bipropellant is cited only as an example and any other suitable bipropellant may be used.

For the purpose of clarification in the drawings, the collapsible containers are shown in a partially collapsed condition, but the containers will possess, after assembly, some form of a more collapsed state.

Raising the combustion chamber pressure will proportionally raise the velocity of the exhaust gases passing out of the exhaust nozzle 16, but in very small combustion zones such as exist in the rockets of small weapons of warfare, limitations are imposed where the bipropellant lacks a sufficient rate of combustion. This low rate of combustion as obtained in rocket performance heretofore, is due in part to the lack of conventional fuels having a sufficiently high rate of decomposition, which can be used in modern rocket structures. Therefore, the highest chamber pressure corresponding to the value providing the highest thermodynamic efficiency should be used.

In the foregoing specification, the term "forward end" has at times been used to indicate, upper end, in referring to the location of parts in the rocket. Likewise, at times the term "rear end" has been used to indicate, bottom end or lower end, in referring to the location of parts in the rocket. This is indicated by the arrow in Fig. 1.

I claim:

1. In combination with a rocket having a combustion chamber and an exhaust nozzle, collapsible containing apparatus holding liquid-propellant components under pressure, liquid-propellant outlet means leading to the combustion chamber having a heat-destructible, valvular device lying between the liquid-filled area of the containing apparatus and the combustion chamber, and a solid propellant in the combustion chamber supporting the valvular device against rupture by the pressure of the liquid-propellant components, the valvular device being responsive to the heat generated by the solid propellant during burning and displacement thereof to open same.

2. In combination with a rocket having a combustion chamber and an exhaust nozzle, bi-compartment collapsible apparatus holding liquid-propellant components separately under pressure, outlet means from each compartment leading to the combustion chamber having a closed diaphragm lying between the liquid-filled area of each compartment and the combustion chamber adapted to open by heat transmitted directly from the combustion chamber to the diaphragm, a solid propellant in the combustion chamber supporting each diaphragm against rupture by the liquid-propellant components and combusting components included in the solid propellant adapted to supply heat to the diaphragms during burning thereof.

3. In combination with a rocket having a combustion chamber and an exhaust nozzle, bi-compartment apparatus holding fuel and a combusting reacting agent separately, means for supplying pressure to the bi-compartment, outlet means from each compartment leading to the combustion chamber having a closed, heat-destructible diaphragm lying between the liquid-filled area of the bi-compartment and the combustion chamber, a solid propellant in the combustion chamber adapted to supply heat to the diaphragms to open same during burning of the solid propellant and one of said diaphragms being characterized by possessing the property of withstanding attack without change in weight or properties when boiled in aqua regia, hydrofluoric acid, sulphuric acid or nitric acid.

4. In a rocket, a thrust developing receptacle including an exhaust nozzle, apparatus for holding a liquid propellant, a propellant conveying system leading from said apparatus to said receptacle, valvular means including a diaphragm in said system and a solid propellant in said receptacle supporting said diaphragm against rupture, said valvular means being responsive to heat generated by the solid propellant during burning and displacement thereof to open the same.

5. In a rocket, a thrust developing receptacle including an exhaust outlet, apparatus holding a liquid propellant, a propellant conveying system leading from said apparatus to said receptacle, valvular means in said system forming an integral and continuous seal with the wall of said apparatus, and a combustible ignition agent in said receptacle supporting the valvular means against rupture thereof prior to burning of the agent, said valvular means being responsive to the heat generated by the ignition agent during burning and displacement thereof to open same.

6. In a missile, a combustion chamber and an exhaust nozzle communicating with said chamber, a solid propellant within said combustion chamber, a container including a liquid propellant communicating with said combustion chamber and rupturable means between said chamber and said container, said rupturable means being supported against rupture by said solid propellant, said rupturable means being responsive to heat generated by the solid propellant during the burning and displacement thereof to rupture the same.

7. In a missile, a pair of chambers communicating one with the other, one of said chambers including combustible solid material and the other combustible liquid material, rupturable means isolating said chambers one from another and supported from rupture by said solid material, said rupturable means being responsive to heat generated by said combustible solid material during the burning and displacement thereof to open the same and adapted to admit said liquid material into the chamber holding said solid material during the burning thereof.

8. In a missile, a pair of chambers communicating one with the other, a rupturable diaphragm between said chambers, a combustible liquid material under pressure in one of said chambers and a booster propellant in the other of said chambers, said booster propellant functioning to support said diaphragm from rupture prior to the burning thereof, said diaphragm being responsive to heat generated by said booster propellant and displacement thereof to open said diaphragm.

9. In a rocket, a receptacle for developing static thrust including a thrust developing zone, an apparatus for holding liquid propellant components under pressure, a liquid propellant conveying and outlet system leading to said receptacle, normally closed valvular means lying between said liquid-filled apparatus and said receptacle, and a booster propellant in said receptacle normally supporting the valvular means, said valvular means being opened by the displacement of said booster propellant and the pressure on said liquid propellant components to admit said liquid components into said receptacle.

10. In combination with a rocket having a receptacle for developing static thrust from reaction products of combustion, including a combustion zone merging into a thrust developing zone, multi-compartmented apparatus holding separately a liquid fuel and a liquid combusting agent under pressure, a conveying and outlet system for the fuel and combusting agent leading to said receptacle, normally closed valvular means lying between said apparatus and the combustion zone and including discharge openings for the pressurized propellant, and a booster propellant in said receptacle normally supporting the valvular means against rupture, said valvular means being opened by the displacement of said booster propellant and the pressure on said liquid fuel and liquid combusting agent.

References Cited in the file of this patent

UNITED STATES PATENTS

| 1,901,852 | Stolfa et al. | Mar. 14, 1933 |
| 2,494,562 | Kessenich | Jan. 17, 1950 |
| 2,505,798 | Skinner | May 2, 1950 |

FOREIGN PATENTS

| 590,177 | Great Britain | July 10, 1947 |
| 272,168 | Switzerland | Feb. 16, 1951 |